United States Patent Office 2,832,614
Patented Apr. 29, 1958

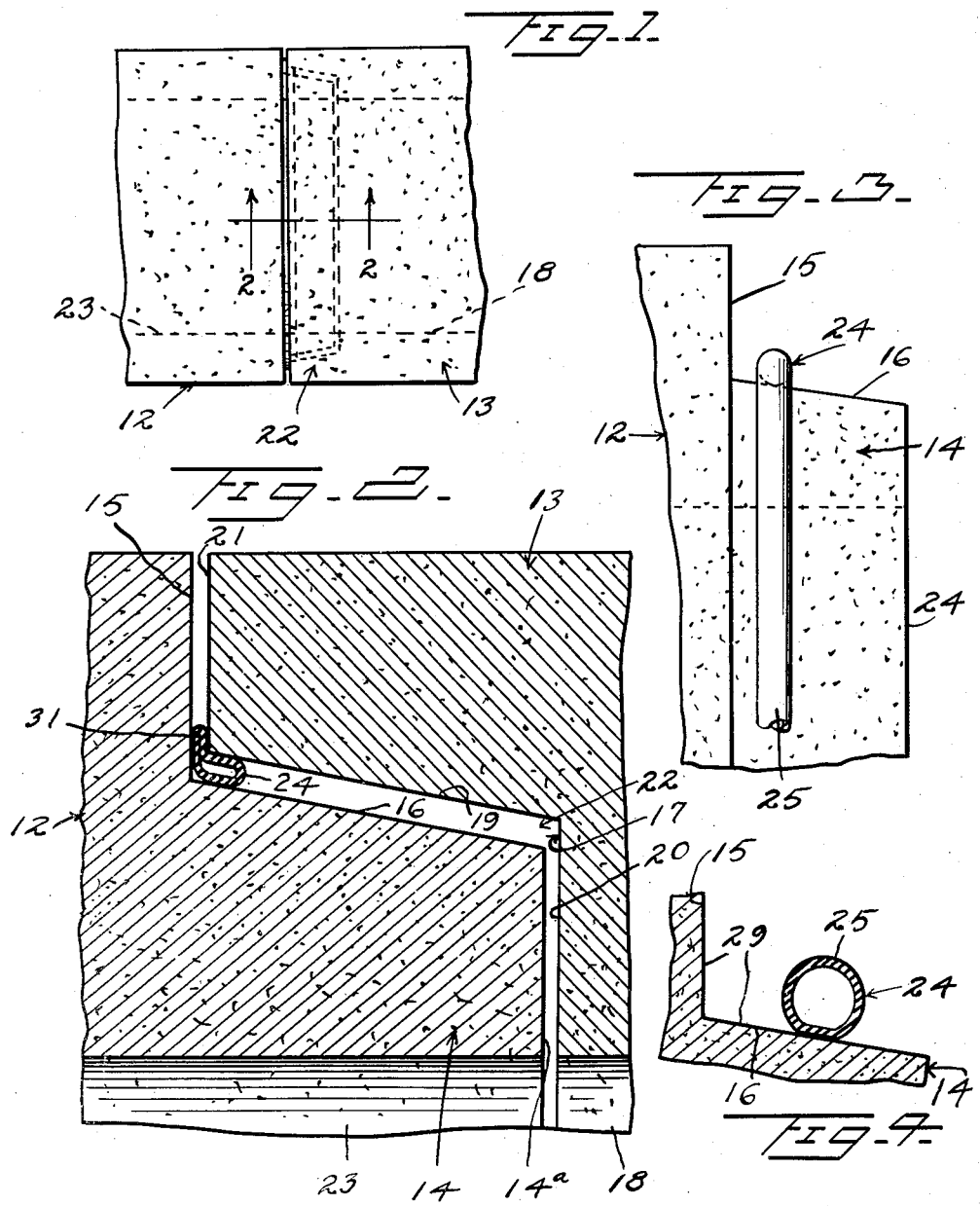

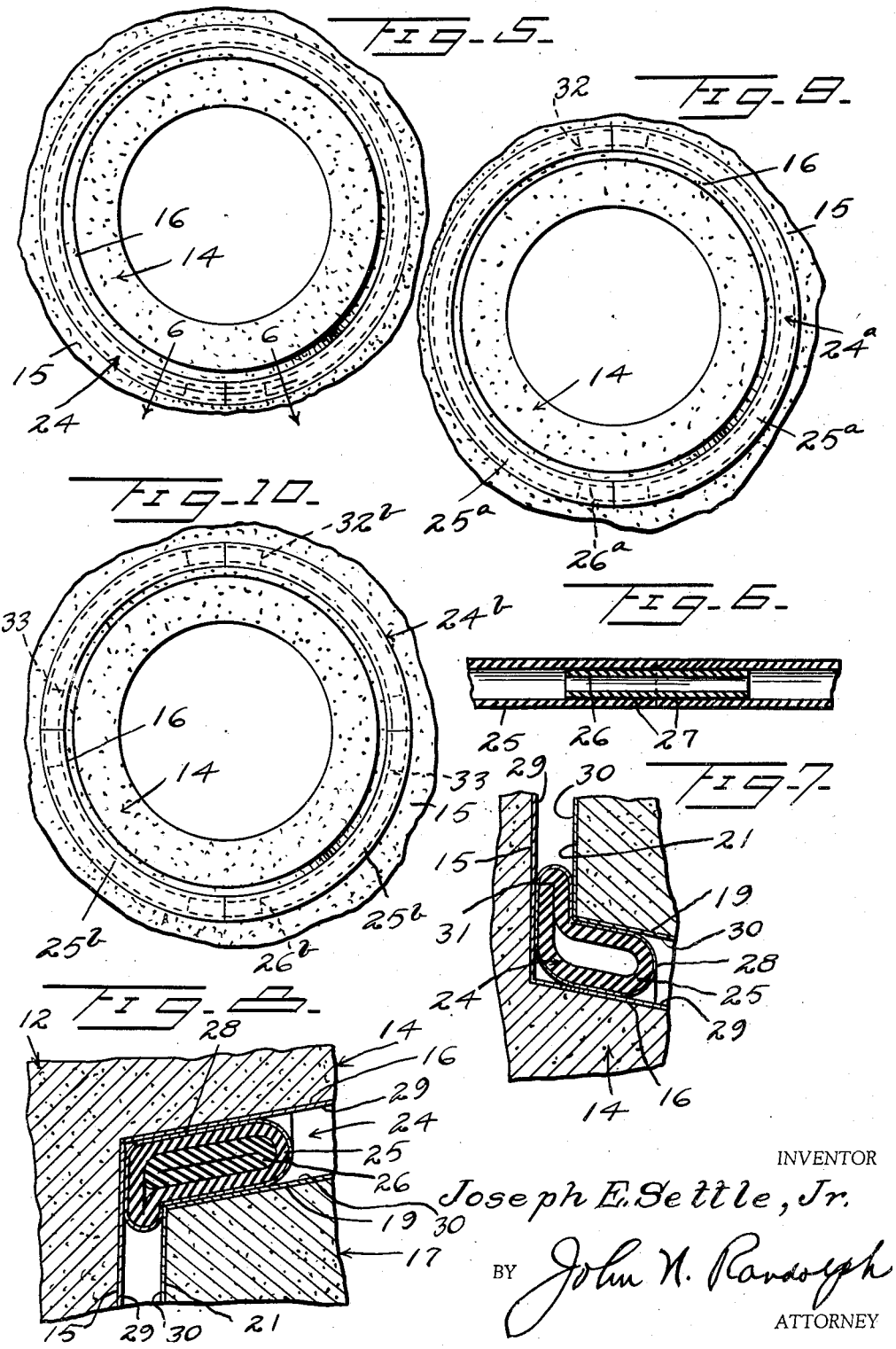

2,832,614

SEAL FOR CONCRETE PIPE JOINT HAVING MEANS FOR SPACING THE PIPE ENDS

Joseph E. Settle, Jr., Charleston, W. Va.

Application March 18, 1955, Serial No. 495,169

3 Claims. (Cl. 285—230)

This invention relates to a novel seal for a concrete pipe joint and to the method of forming a sealed pipe joint which is root resistant, which will last longer than conventional pipe joints, which is flexible to adjust to settlement of the pipe, which will not separate from the pipe and which is capable of withstanding a substantial internal or external pressure.

Another object of the invention is to provide a concrete pipe joint which is not affected by a solution of hydrochloric acid of a strength normally found around such joints or by a combination of sulfuric acid and sewerage slime.

A further object of the invention is to provide a pipe joint seal which is economical to manufacture and install.

A further object of the invention is to provide a pipe joint including a novel gasket which readily adapts itself to irregularities in adjacent surfaces of the spigot and bell of the pipe joint to produce an effective seal.

Still another object of the invention is to provide a pipe joint seal including a gasket having means to maintain pipe sections connected by the joint in proper alignment to insure a smooth flow line even when the conduit is placed so that one of the sections, forming a part of the joint, is permitted to float.

Various other objects and advantages of the invention will hereinafter become more fully apparent from the following description of the drawings, illustrating presently preferred embodiments thereof, and wherein:

Figure 1 is a fragmentary top plan view of a portion of a concrete conduit showing the pipe joint in a fully closed position;

Figure 2 is an enlarged fragmentary sectional view, taken substantially along a plane as indicated by the line 2—2 of Figure 1;

Figure 3 is an enlarged fragmentary side elevational view of a part of the joint;

Figure 4 is an enlarged fragmentary sectional view of the male joint part as seen in Figure 3;

Figure 5 is an end elevational view of the male joint part, looking from right to left of Figure 3 and on a reduced scale relative to Figure 3;

Figure 6 is an enlarged fragmentary circumferential sectional view of a portion of the sealing gasket, taken substantially along a plane as indicated by the line 6—6 of Figure 5;

Figure 7 is an enlarged fragmentary sectional view, similar to a portion of Figure 2;

Figure 8 is a view similar to Figure 7, taken through a part of the sealing gasket provided with a spacer;

Figure 9 is a view similar to Figure 5 illustrating a slightly different form of the sealing gasket, and Figure 10 is a view similar to Figures 5 and 9 of a further modified form of the sealing gasket.

Referring more specifically to the drawings, adjacent end portions 12 and 13 of two sections of concrete or similar pipe of the type used in forming sewer conduits or the like are shown. The end portion 12 has a tongue or spigot 14 of conventional shape which is surrounded by an annular shoulder 15, which is disposed crosswise of the axis of the conduit portion 12, as best seen in Figure 3. The outer surface of the annular tongue or spigot 14, designated 16, is tapered away from the shoulder 15 and thus forms an angle with said shoulder greater than 90°.

The other conduit end portion 13, as best seen in Figure 2, is provided with a recess 17 in the wall thereof which opens into the bore 18 of the conduit portion 13 and which includes an inwardly tapered annular surface 19 and an inner annular surface 20. The surface 20 is disposed transversely of the axis of the conduit portion 13. The conduit portion 13 also has an annular end wall 21 extending between its periphery and the enlarged open outer end of the recess 17 and which is disposed parallel to the wall 20 and at an obtuse angle to the wall 19. Said wall 19 is disposed substantially parallel to the outer surface 16 of the spigot when the joint is assembled, as seen in Figure 2. The complete joint as formed by the adjacent end portions of the conduit sections 12 and 13 is designated generally 22. The conduit section 12 has a bore 23 which aligns with the bore 18 when the joint 22 is closed, as seen in Figures 1 and 2. The spigot 14 has an end wall 14a, which is disposed substantially parallel to the inner end wall 20, when the joint 22 is closed. The parts previously described are of conventional construction and constitute a usual type of joint between adjacent ends of pipe sections of a sewer conduit.

The joint 22 is sealed by a sealing ring or gasket 24 of hollow or tubular construction, as seen in Figures 4 and 6, and which is preferably formed of a synthetic rubber such as neoprene. In the form of the invention as illustrated in Figures 1 to 8, the sealing ring or gasket 24 is formed from a tube 25 the ends of which are joined together in substantially end-to-end abutting relation by a short length of tubing 26 of smaller external diameter, the end portions of which fit snugly into the ends of the tube 25. The end portions of the tube 26 are secured in the ends of the tube 25 by a suitable bonding medium or cement which is applied as a coating 27 to the exterior of the tube 26. The parts 25 and 26 and the coating 27 thus form the sealing ring or gasket 24. The tube 26 in addition to providing a connector for the ends of the tube 25 additionally function as a reinforcing member and spacer, as will hereinafter be described. It will thus be seen that the sealing ring or gasket 24 may be made of any proper diameter to fit a spigot 14 of any given exterior diameter. The tube 25 may be of different cross sectional sizes but for most purposes is preferably 11/16 of an inch in diameter and has a bore of 1/2 inch diameter. The joint as illustrated in Figure 6, formed by the connector tube 26 and the ends of the tube 25 which are secured to the tube 26 by the adhesive coating 27, is capable of withstanding a pull of twenty-five pounds. The ring or gasket 24 is made of a diameter so that when applied to the spigot 14 and spaced from the shoulder 15 a distance varying between the exterior diameter and 1/2 the exterior diameter of the tubing 25, will engage the spigot surface 16 and have a tension of approximately two pounds.

Before the ring or gasket 24 is applied to the spigot 14, as illustrated in Figures 3 and 5, said ring or gasket is coated with a neoprene coating which becomes a part thereof and which remains soft, even though dry enough to handle or ship, and which readily cements itself firmly to the spigot surface 16. Said neoprene coating, designated 28, is best illustrated in Figure 7.

As best seen in Figures 2, 4 and 8, the surfaces 15 and 16 are likewise covered with the same neoprene coating, as seen at 29, before the gasket 24 is applied to the spigot 14.

A coating 30 of the same material is applied to the surfaces 19 and 21 of the conduit portion 13. The coating 30 is applied shortly before assembly of the spigot 14 in the bell 17 so that the coating 30 will be slippery when the spigot 14 is moved into the bell 17 or said bell 17 is moved into engagement over the spigot 14. As this is accomplished, and as the bell end 21 approaches the shoulder 15 or vice versa, a part of the tapered bell surface or wall 19 will engage the gasket or ring 24 so that said gasket will be rolled on the spigot surface 16 toward the shoulder 15 and a part of the portion thereof which is disposed beyond the connector or spacer 26 will be mashed flat, as seen at 31, between the joint surfaces 15 and 21 when the joint is in a fully closed position, as illustrated in Figure 2. As seen in Figure 5, the connector and spacer member 26 is disposed beneath the spigot 14 and when the joint is fully closed, the bottom portion of the gasket 24 in which the spacer 26 is disposed will be of the cross sectional shape as illustrated in Figure 8, with the spacer member 26 flattened. The spacer member 26 will thus function with the ends of the tubing 25 to effectively maintain the bores 23 and 18 in proper alignment to insure a smooth flow line through the conduit portions 12 and 13. The spacer 26 in combination with the tube ends which surround it is readily capable of sustaining the weight of the conduit end portions 12 and 13.

It will also be readily apparent that the part of the gasket 24 located beyond the ends of the spacer 26 is not flattened completely and it will also be apparent that the gasket 24 will contain air which will be compressed by a partial collapsing thereof so that the gasket will be yieldably retained in tight engagement with the coated surfaces of the walls 15, 16, 19 and 21 to provide an effective seal for the joint 22.

The coating 28 penetrates the gasket 24 and becomes an intimate part thereof. The coatings 29 and 30 penetrate the joint surfaces to which they are applied and any excess amount of the coatings 29 and 30 is pressed into irregularities in the joint surfaces.

The gasket 24 functions in the same manner as a rubber gasket of the same construction would function and in addition due to the fact that it is formed of a synthetic material such as neoprene and due to the neoprene coating thereof and of the joint surfaces, a joint is provided which is root resistant and the gasket 24 has a longer effective life than if formed of natural rubber, yet is sufficiently flexible and elastic to readily adjust itself to settlement of the pipe portions forming the joint and due to the coatings 28, 29 and 30 will not separate from the joint walls. The gasket is capable of withstanding a pressure either internally or externally in excess of twenty pounds per square inch and is not affected by hydrochloric acid or a combination of sulfuric acid and sewage slime in concentrations normally found around sewerage or underground conduits.

Where the conduit ends 12 and 13 are placed in a manner that would permit one of said ends to float, as in a tunnel where back filling is to be done with grout, a second spacer 32, as seen in Figure 9, is provided in the gasket. The modified gasket 24a of Figure 9 is thus formed of two lengths of tubing 25a which are connected to form the annular gasket or sealing ring 24a by the connector 32 and a connector 26a, corresponding to the connector 26. The connector 32 likewise corresponds to the connector 26 and like the connector 26a is mounted in and connected to abutting ends of the two lengths of tubing 25a by a bonding medium, in the manner as previously described and illustrated in detail in Figure 6. When the joint is closed, utilizing the gasket 24a, the portions of the gasket located above and below the spigot 14 will each appear as seen in Figure 8 with the spacer members 26a and 32 flattened, to maintain a smooth flow line.

Where there is a possibility of lateral movement of either conduit section as well as vertical movement, a gasket as shown in Figure 10 and designated 24b may be provided. The gasket 24b differs from the gasket 24a in that it is composed of four tube sections 25b, a bottom spacer 26b corresponding to the spacer 26, a top spacer 32b, corresponding to the spacer 32, and two spacers 33, corresponding to the spacers 26b and 32b and which are disposed substantially opposite one another and spaced substantially equal distances from the spacers 26b and 32b. The gaskets 24a and 24b otherwise correspond to the gasket 24 and are applied in the same manner, are similarly coated and have the same sealing efficiency.

It will thus be seen that a novel gasket has been provided for concrete pipe joints and a novel process for sealing such joints using the gasket.

Various modifications and changes are contemplated and may obviously be resorted to, without departing from the spirit or scope of the invention as hereinafter defined by the appended claims.

I claim as my invention:

1. A seal for a concrete pipe joint comprising an annular tubular sealing gasket adapted to engage around a spigot of a concrete pipe joint and to be compressed between wall portions of the spigot and bell forming the joint for sealing said joint, said gasket being formed of an elastic material impervious to air and being partially collapsed in a closed position of the joint whereby air contained within the gasket will be compressed to maintain the gasket in conformable engagement with adjacent wall portions of the joint, said gasket comprising a plurality of tube sections disposed in abutting end to end relation, tubular spacing and connecting members engaging in adjacent ends of said tube sections, and means adhesively connecting each of said connecting and spacing members to the tube section ends engaged thereby and combining with the connecting and spacing members to form an annular gasket defining a sealed airtight chamber, said connecting and spacing members cooperating with the ends of the tube sections to form circumferentially spaced gasket segments of increased wall thickness.

2. The combination with a concrete pipe joint including a spigot having an outwardly tapered exterior wall, a bell having an annular inwardly tapered wall disposed around said spigot, an annular shoulder surrounding the inner end of said spigot and an annular end wall constituting the distal end of the bell; of an annular tubular gasket formed of an elastic material impervious to air and sized to fit snugly about said spigot and at a point spaced from the shoulder, said gasket being engaged by the tapered wall of the bell for rolling movement against said shoulder as the joint is closed and being partially collapsed by engagement of an annular portion thereof between the shoulder and end wall and another annular portion thereof between the tapered walls of the spigot and bell, in a closed position of the joint, said gasket comprising a ring shaped tube having abutting end portions, and a tubular spacer disposed in and connecting said end portions and positioned beneath the spigot of the joint for maintaining the spigot and bell parts of the joint in substantially axial alignment.

3. The combination with a concrete pipe joint including a spigot having an outwardly tapered exterior wall, a bell having an annular inwardly tapered wall disposed around said spigot, an annular shoulder surrounding the inner end of said spigot, and an annular end wall constituting the distal end of the bell; of an annular tubular gasket formed of an elastic material impervious to air and sized to fit snugly around the spigot adjacent to but spaced from the shoulder, said gasket being rolled against the shoulder by engagement with the tapered internal wall of the bell as the joint is closed for partially collapsing the gasket into angular cross sectional form including an annular part disposed between the shoulder and end wall and another annular part disposed between said tapered walls, said gasket comprising a ring shaped tube having abutting end portions, and a tubular spacer disposed in and connecting said end portions and positioned beneath the spigot of the joint for maintaining the spigot and bell parts of the joint in substantially axial alignment.

References Cited in the file of this patent

UNITED STATES PATENTS

| | | |
|---|---|---|
| 748,586 | Coddington | Jan. 5, 1904 |
| 1,477,560 | Heeney | Dec. 18, 1923 |
| 1,593,009 | Bigler | July 20, 1926 |
| 1,962,837 | Raible | June 12, 1934 |
| 2,223,434 | Trickey | Dec. 3, 1940 |
| 2,271,936 | Carson | Feb. 3, 1942 |
| 2,272,115 | Halkyard | Feb. 3, 1942 |

FOREIGN PATENTS

| | | |
|---|---|---|
| 865,885 | Germany | Dec. 24, 1952 |